(12) United States Patent
Johnson (10) Patent No.: US 10,812,708 B2
(45) Date of Patent: Oct. 20, 2020

(54) IMAGING SYSTEMS WITH WEATHERING DETECTION PIXELS

(71) Applicant: SEMICONDUCTOR COMPONENTS INDUSTRIES, LLC, Phoenix, AZ (US)

(72) Inventor: Richard Scott Johnson, Boise, ID (US)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 0 days.

(21) Appl. No.: 16/460,668

(22) Filed: Jul. 2, 2019

(65) Prior Publication Data

US 2020/0275019 A1 Aug. 27, 2020

Related U.S. Application Data

(60) Provisional application No. 62/809,253, filed on Feb. 22, 2019.

(51) Int. Cl.
| | |
|---|---|
| *H04N 5/232* | (2006.01) |
| *H04N 9/04* | (2006.01) |
| *H04N 5/225* | (2006.01) |
| *H04N 9/64* | (2006.01) |

(52) U.S. Cl.
CPC ....... *H04N 5/23229* (2013.01); *H04N 5/2254* (2013.01); *H04N 5/2258* (2013.01); *H04N 9/04551* (2018.08); *H04N 9/64* (2013.01); *H04N 2209/045* (2013.01)

(58) Field of Classification Search
None
See application file for complete search history.

(56) References Cited

U.S. PATENT DOCUMENTS

| | | | |
|---|---|---|---|
| 2004/0002178 A1* | 1/2004 | Fasen | H01L 27/14621 438/57 |
| 2006/0266921 A1* | 11/2006 | Kang | H04N 9/045 250/208.1 |
| 2011/0074750 A1* | 3/2011 | Leon | G09G 3/3233 345/207 |
| 2011/0102649 A1* | 5/2011 | Hashizume | H04N 5/3675 348/246 |

(Continued)

*Primary Examiner* — James M Hannett
(74) *Attorney, Agent, or Firm* — Treyz Law Group, P.C.; David K. Cole (57) ABSTRACT

An imaging device may have an array of image sensor pixels. The array of image sensor pixels may have main pixels and reference pixels that are overlapped by optical stacks. The reference pixels may be more resistant to weathering, such as solar degradation, than the main pixels. For example, optical stacks overlapping the main pixels may include antireflection coatings, while optical stacks overlapping the reference pixels may not include antireflection coatings. Alternatively or additionally, the optical stacks overlapping the main pixels may include color filter resist formed from a first pigment, and the optical stacks overlapping the reference pixels may include color filter resist formed from a second pigment that is more resistant to weathering than the first pigment. Processing circuitry may compare outputs of the main pixels and the reference pixels to determine whether pixels in the array have been damaged.

17 Claims, 6 Drawing Sheets

(56) References Cited

U.S. PATENT DOCUMENTS

| | | | |
|---|---|---|---|
| 2013/0250415 A1* | 9/2013 | Gupta | G02B 5/3041 |
| | | | 359/489.09 |
| 2013/0329053 A1* | 12/2013 | Jones | G06K 9/4652 |
| | | | 348/164 |
| 2014/0002698 A1* | 1/2014 | Shoyama | H04N 9/045 |
| | | | 348/242 |
| 2015/0372037 A1* | 12/2015 | Tomeba | H04N 5/2257 |
| | | | 257/432 |
| 2016/0284747 A1* | 9/2016 | Park | H01L 27/14689 |
| 2017/0118398 A1* | 4/2017 | Sano | H04N 5/3696 |
| 2018/0213142 A1* | 7/2018 | Usui | H04N 5/37457 |
| 2019/0244992 A1* | 8/2019 | Yokogawa | H01L 27/14605 |

\* cited by examiner

IMAGING SYSTEMS WITH WEATHERING DETECTION PIXELS

CROSS-REFERENCE TO RELATED APPLICATIONS

This application claims the benefit of U.S. Provisional Patent Application No. 62/809,253, filed on Feb. 22, 2019, the entire contents of which is incorporated herein by reference.

BACKGROUND

This relates generally to imaging devices, and more particularly, to imaging sensors that include weathering detection pixels.

Image sensors are commonly used in electronic devices such as cellular telephones, cameras, and computers to capture images. In a typical arrangement, an electronic device is provided with an array of image pixels arranged in pixel rows and pixel columns. Each image pixel in the array includes a photodiode that is coupled to a floating diffusion region via a transfer gate. Each pixel receives incident photons (light) and converts the photons into electrical signals. Column circuitry is coupled to each pixel column for reading out pixel signals from the image pixels. Image sensors are sometimes designed to provide images to electronic devices using a Joint Photographic Experts Group (JPEG) format.

Conventional imaging systems employ an image sensor in which the visible light spectrum is sampled by different colored image pixels that are arranged in the image pixel array. For example, the image pixel array may include red, green, and blue (RGB) image pixels arranged in a Bayer mosaic pattern. However, in typical arrangements, the imaging system may be unable to determine whether or not image pixels in the array have been damaged due to weathering.

It would therefore be desirable to be able to provide imaging devices with improved image sensor pixels.

DETAILED DESCRIPTION

Embodiments of the present invention relate to image sensors, and more particularly, to image sensors having reference pixels that may be used to detect whether weathering has deteriorated portions of an image pixel array. It will be recognized by one skilled in the art, that the present exemplary embodiments may be practiced without some or all of these specific details. In other instances, well known operations have not been described in detail in order to not unnecessarily obscure the present embodiments.

Imaging systems having digital camera modules are widely used in electronic devices such as digital cameras, computers, cellular telephones, and other electronic devices. A digital camera module may include one or more image sensors that gather incoming light to capture an image. Image sensors may include arrays of image pixels. The pixels in the image sensors may include photosensitive elements such as photodiodes that convert the incoming light into electric charge. Image sensors may have any number of pixels (e.g., hundreds or thousands or more). A typical image sensor may, for example, have hundreds, thousands, or millions of pixels (e.g., megapixels). Image sensors may include control circuitry such as circuitry for operating the image pixels and readout circuitry for reading out image signals corresponding to the electric charge generated by the photosensitive elements.

Image sensor pixels may be covered by color filters that allow light of a particular wavelength to pass. For example, image sensor pixels may be covered by red color filters, blue color filters, green color filters, or any other desired color filters. Additionally, image sensor pixels may be covered by other layers, including glass layers, microlens layers, and antireflection coating layers. The layers, which may be collectively referred to as an optical stack, may be adjusted to reduce the weathering of at least some of the image sensor pixels within an array of image sensor pixels, and these pixels may be used as a reference to determine whether weathering has deteriorated portions of the image pixel array.

Figure 1:
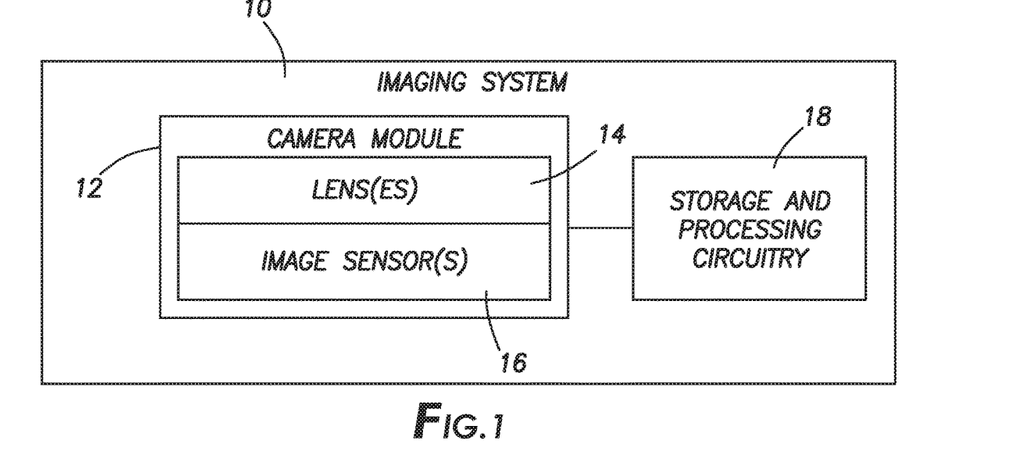
FIG. 1 is a diagram of an illustrative electronic device having an image sensor and processing circuitry for capturing images using an array of image pixels in accordance with an embodiment.

FIG. 1 is a diagram of an illustrative imaging system such as an electronic device that uses an image sensor to capture images. Electronic device 10 of FIG. 1 may be a portable electronic device such as a camera, a cellular telephone, a tablet computer, a webcam, a video camera, a video surveillance system, an automotive imaging system, a video gaming system with imaging capabilities, or any other desired imaging system or device that captures digital image data. Camera module 12 may be used to convert incoming light into digital image data. Camera module 12 may include one or more lenses 14 and one or more corresponding image sensors 16. Lenses 14 may include fixed and/or adjustable lenses and may include microlenses formed on an imaging surface of image sensor 16. During image capture operations, light from a scene may be focused onto image sensor 16 by lenses 14. Image sensor 16 may include circuitry for converting analog pixel data into corresponding digital image data to be provided to storage and processing circuitry 18. If desired, camera module 12 may be provided with an array of lenses 14 and an array of corresponding image sensors 16.

Storage and processing circuitry 18 may include one or more integrated circuits (e.g., image processing circuits, microprocessors, storage devices such as random-access memory and non-volatile memory, etc.) and may be implemented using components that are separate from camera module 12 and/or that form part of camera module 12 (e.g., circuits that form part of an integrated circuit that includes image sensors 16 or an integrated circuit within module 12 that is associated with image sensors 16). Image data that has been captured by camera module 12 may be processed and stored using processing circuitry 18 (e.g., using an image processing engine on processing circuitry 18, using an imaging mode selection engine on processing circuitry 18, etc.). Processed image data may, if desired, be provided to external equipment (e.g., a computer, external display, or other device) using wired and/or wireless communications paths coupled to processing circuitry 18.

Figure 2:
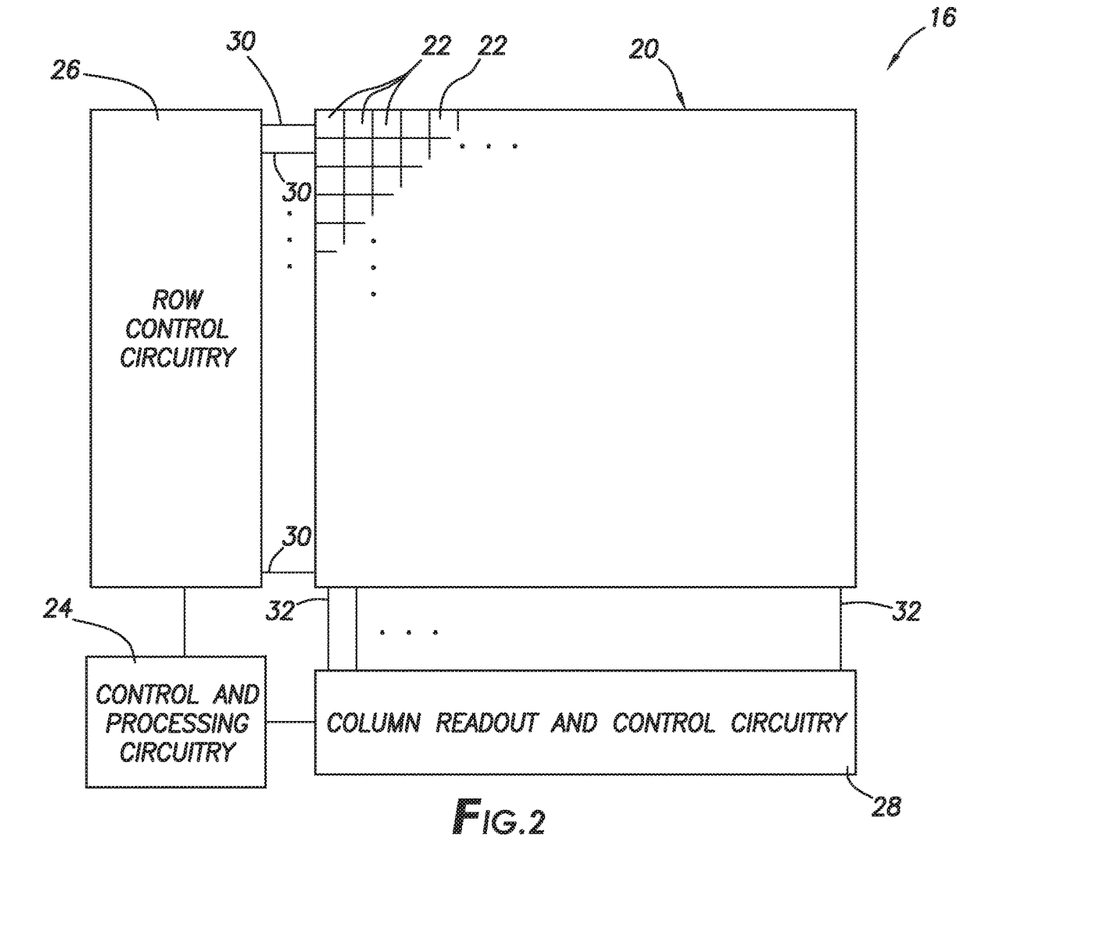
FIG. 2 is a diagram of an illustrative pixel array and associated readout circuitry for reading out image signals from the pixel array in accordance with an embodiment.

As shown in FIG. 2, image sensor 16 may include a pixel array 20 containing image sensor pixels 22 arranged in rows and columns (sometimes referred to herein as image pixels or pixels) and control and processing circuitry 24. Array 20 may contain, for example, hundreds or thousands of rows and columns of image sensor pixels 22. Control circuitry 24 may be coupled to row control circuitry 26 and image readout circuitry 28 (sometimes referred to as column control circuitry, readout circuitry, processing circuitry, or column decoder circuitry). Row control circuitry 26 may receive row addresses from control circuitry 24 and supply corresponding row control signals such as reset, row-select, charge transfer, dual conversion gain, and readout control signals to pixels 22 over row control paths 30. One or more conductive lines such as column lines 32 may be coupled to each column of pixels 22 in array 20. Column lines 32 may be used for reading out image signals from pixels 22 and for supplying bias signals (e.g., bias currents or bias voltages) to pixels 22. If desired, during pixel readout operations, a pixel row in array 20 may be selected using row control circuitry 26 and image signals generated by image pixels 22 in that pixel row can be read out along column lines 32.

Image readout circuitry 28 (sometimes referred to as column readout and control circuitry 28) may receive image signals (e.g., analog pixel values generated by pixels 22) over column lines 32. Image readout circuitry 28 may include sample-and-hold circuitry for sampling and temporarily storing image signals read out from array 20, amplifier circuitry, analog-to-digital conversion (ADC) circuitry, bias circuitry, column memory, latch circuitry for selectively enabling or disabling the column circuitry, or other circuitry that is coupled to one or more columns of pixels in array 20 for operating pixels 22 and for reading out image signals from pixels 22. ADC circuitry in readout circuitry 28 may convert analog pixel values received from array 20 into corresponding digital pixel values (sometimes referred to as digital image data or digital pixel data). Image readout circuitry 28 may supply digital pixel data to control and processing circuitry 24 and/or processor 18 (FIG. 1) over path 25 for pixels in one or more pixel columns.

If desired, image pixels 22 may include one or more photosensitive regions for generating charge in response to image light. Photosensitive regions within image pixels 22 may be arranged in rows and columns on array 20. Pixel array 20 may be provided with a color filter array having multiple color filter elements which allows a single image sensor to sample light of different colors. As an example, image sensor pixels such as the image pixels in array 20 may be provided with a color filter array which allows a single image sensor to sample red, green, and blue (RGB) light using corresponding red, green, and blue image sensor pixels arranged in a Bayer mosaic pattern. The Bayer mosaic pattern consists of a repeating unit cell of two-by-two image pixels, with two green image pixels diagonally opposite one another and adjacent to a red image pixel diagonally opposite to a blue image pixel. In another suitable example, the green pixels in a Bayer pattern are replaced by broadband image pixels having broadband color filter elements (e.g., clear color filter elements, yellow color filter elements, etc.). These examples are merely illustrative and, in general, color filter elements of any desired color and in any desired pattern may be formed over any desired number of image pixels 22.

Image sensor 16 may be configured to support a global shutter operation (e.g., pixels 22 may be operated in a global shutter mode). For example, the image pixels 22 in array 20 may each include a photodiode, floating diffusion region, and local charge storage region. With a global shutter scheme, all of the pixels in the image sensor are reset simultaneously. A charge transfer operation is then used to simultaneously transfer the charge collected in the photodiode of each image pixel to the associated charge storage region. Data from each storage region may then be read out on a per-row basis, for example.

Figure 3:
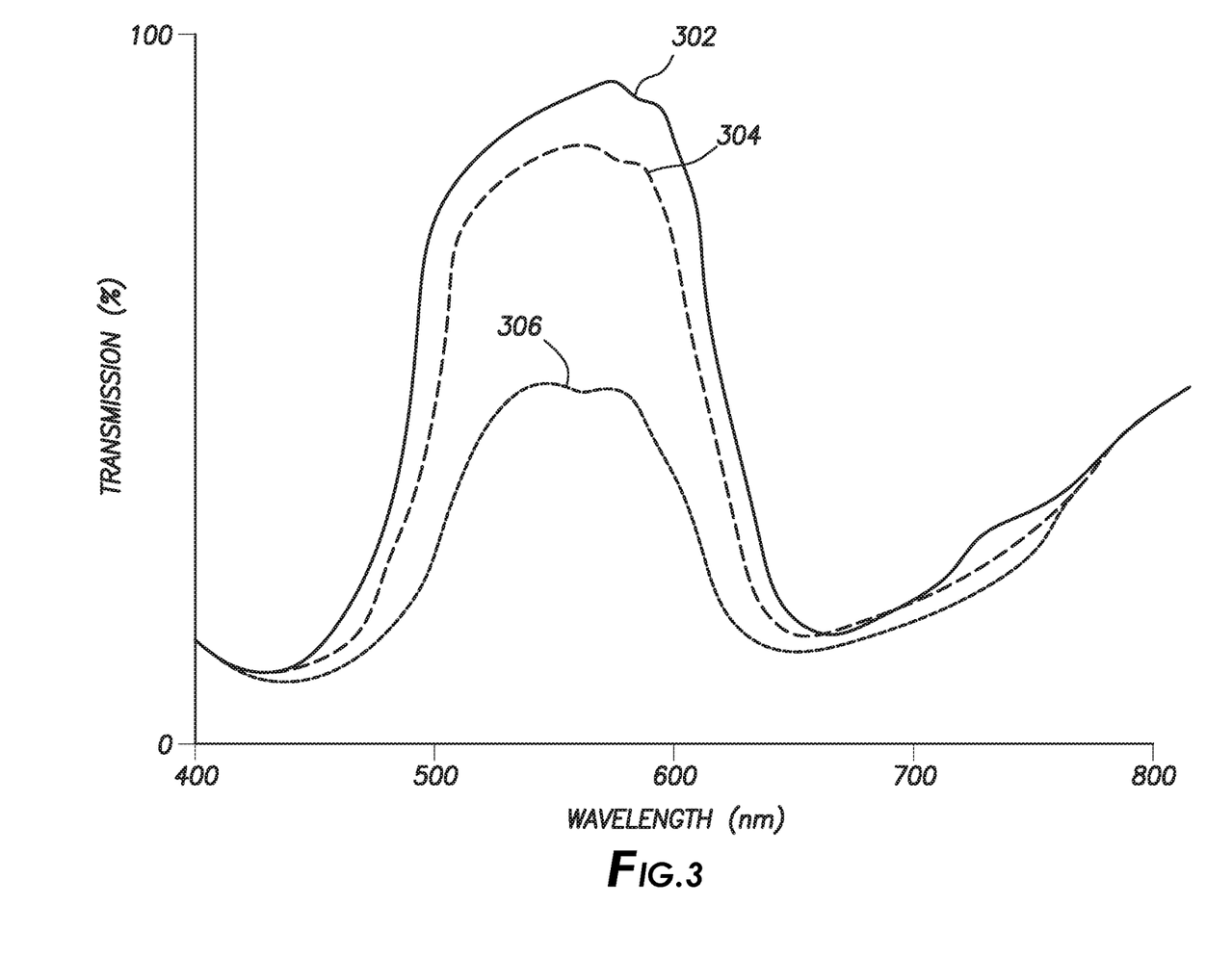
FIG. 3 is a graph in which light transmission has been plotted as a function of wavelength at different times in accordance with an embodiment.

Each image pixel, such as image pixel 22, of an array of image pixels, may be provided with overlying layers, such as color filter layers, that may deteriorate during use. FIG. 3 is a graph illustrating light transmission for an illustrative image pixel, such as one of image pixels 22 of FIG. 2, over a time of weathering exposure (hereon referred to as exposure). Curve 302 may correspond to light transmission for a new image pixel (e.g., at time 0). As shown, curve 302 may have increased transmission between 500 nm and 600 nm, as well as over 700 nm. Curve 302 may have a peak transmission of over 90%, over 95%, less than 100%, or over 80%, as examples. However, this is merely illustrative. The initial peak transmission of an image sensor pixel may be adjusted as desired.

Curve 304 may correspond to light transmission for the image pixel after the pixel has been in exposure for a period of time. As examples, curve 304 may correspond to light transmission for the image pixel after 5 hours of exposure, after 50 hours of exposure, after less than 500 hours of exposure, or after more than 100 hours of exposure. As shown by curve 304, the transmission for the image pixel has decreased across all wavelengths, most significantly between 500 nm and 600 nm. For example, the peak transmission of the image pixel may be reduced to less than 90%, less than 80%, more than 60%, or less than 70%.

Curve 306 may correspond to light transmission for the image pixel after additional exposure time has passed after the exposure time corresponding to curve 304. For example, curve 306 may correspond to light transmission after 1000 hours of exposure. As shown by curve 306, the peak transmission has further decreased, and may be less than 60%, less than 50%, or more than 40%, as examples.

The reduction in transmission illustrated by curves 304 and 306 may be caused by weathering of the image pixels within the image pixel array. For example, if the image pixel array is exposed to sunlight for extended periods of time, solar energy may damage some of the layers that overlap the image pixels, thereby reducing the amount of light that reaches some of the image pixels in the array of image pixels. Solar energy may reduce the transmission through layers overlapping image sensor pixels by bleaching color filter material or microlens material. Bleaching of these layers may result in artifacts in the images generated by the image sensor pixels. Image sensors that may be affected by these weathering effects may be used in security cameras, automotive applications, or any other field in which cameras are exposed to sunlight for prolonged periods. However, this is merely illustrative. Any image sensors may be susceptible to damage from solar energy. This poses a risk, especially in a field such as automotive applications, in which processing circuitry may algorithmically analyze images that are captured by image sensors. The reduced transmission through portions of the image sensor may reduce the accuracy of the results of such algorithms and thus pose a safety risk.

Figure 4:
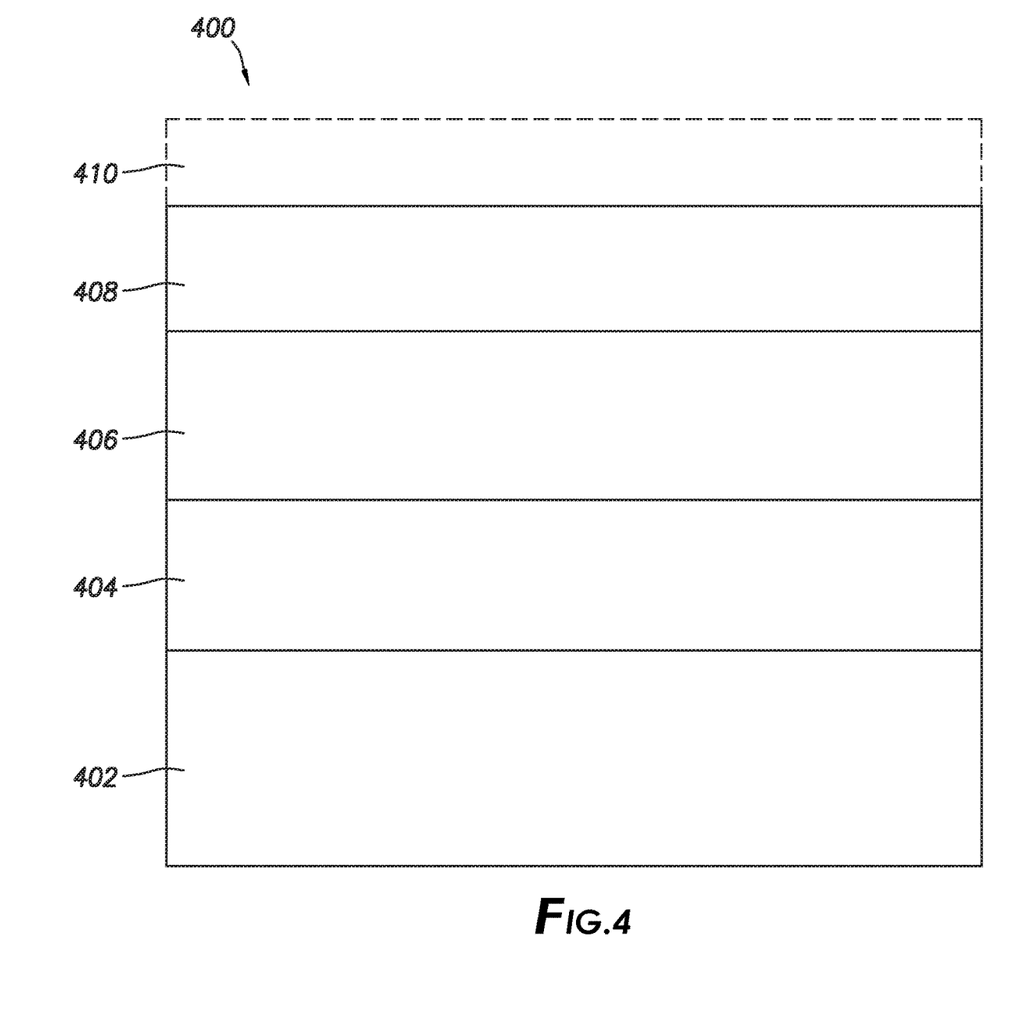
FIG. 4 is a cross-sectional side view of an optical stack that may be applied over an image sensor pixel in accordance with an embodiment.

FIG. 4 illustrates various layers that may overlap image pixels, such as image pixels 22 of FIG. 2. These various layers may be collectively referred to as an optical stack herein. As shown in FIG. 4, optical stack 400 may include the image sensor as manufactured in either Back Side Illumination, Front Side Illumination, or wafer stacking techniques up to the point of requiring further optical path manufacturing 402 on which color filter resist 404 is applied. Color filter resist 404 may correspond to a certain color (e.g., red, blue, or green) that the underlying image sensor pixel is configured to detect. For example, if a given pixel is a red image pixel, the given pixel may be overlapped by red color filter resist. Color filter resist 404 may be colored using various pigments. For example, a red color filter resist may be colored using a red pigment. However, this is merely illustrative. In general, any pigment or combination of pigments may be used to impart a desired color on a given color filter resist.

Microlens 406 and planarization layer 408 may be deposited on color filter resist 404. Microlens 406 and planarization layer 408 may be formed from acrylic, glass, polymer, or any other desired material. In general, microlens 406 and planarization layer 408 may be formed from the same material or may be formed from different materials. Microlens 406 may focus incident light on the underlying image sensor pixel or may redirect light within the array of image sensor pixels. The shape, size, or orientation of microlens 406 may be adjusted to focus the incident light as desired.

Optional antireflection coating 410 may be applied over microlens 406 and planarization layer 408. Antireflection coating 410 may improve the transmission of ambient light to the underlying image sensor pixel. In particular, antireflection coating 410 may reduce the number of particles that adhere to the image pixel array both during and after manufacturing, thereby reducing artifacts in images produced by the image pixel array. Moreover, antireflection coating 410 may increase the sensitivity of the underlying image sensor pixel. Antireflection coating 410 may be formed from silicon dioxide ($SiO_2$), for example. However, any desired material may be used to form antireflection coating 410.

During exposure of an image sensor, the layers of optical stack 400 (e.g., the optical stack applied over at least one of the pixels of the array of pixels in the image sensor) may be damaged. For example, some of the materials used to form the layers of optical stack 400 may be damaged from exposure to sunlight. In particular, solar energy may bleach some of the layers of optical stack 400, thereby creating artifacts in the final image data produced by the image sensor.

Figure 5A:
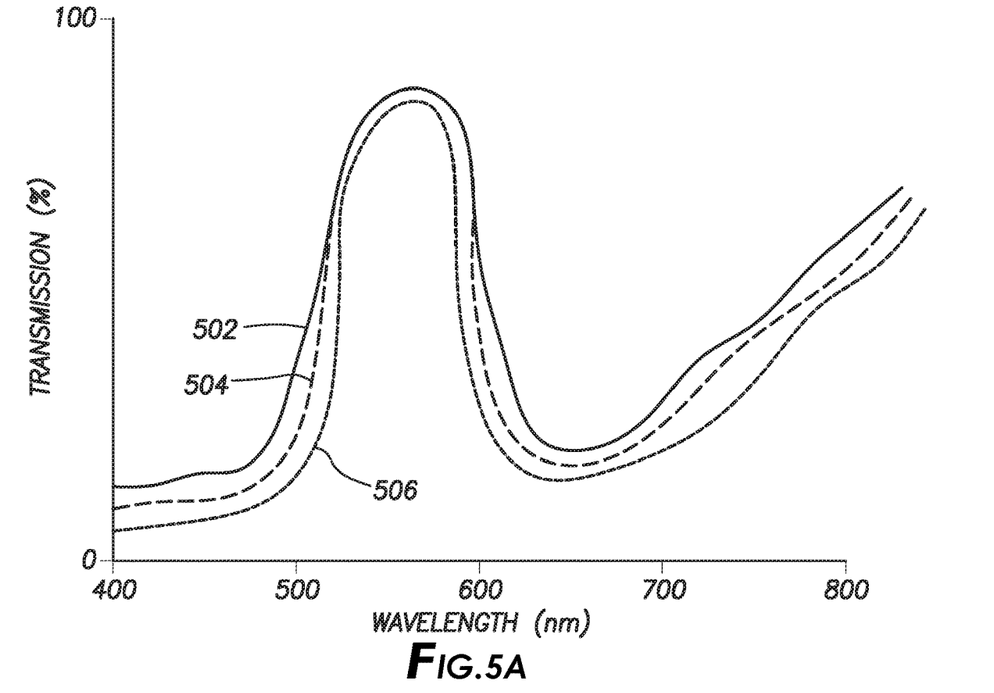
FIG. 5A is a graph in which light transmission has been plotted as a function of wavelength at different times for a set of reference pixels in accordance with an embodiment.
Figure 5B:
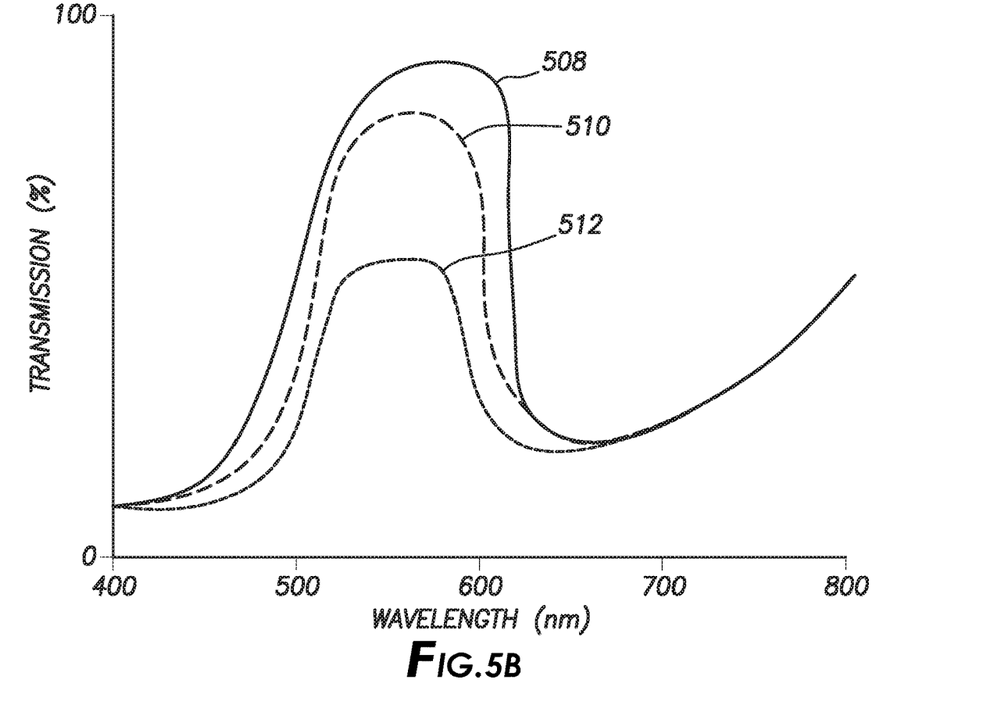
FIG. 5B is a graph in which light transmission has been plotted as a function of wavelength at different times for a set of main pixels in accordance with an embodiment.

FIGS. 5A and 5B are graphs showing transmission percentage as a function of wavelength for optical stacks having different characteristics. As shown in FIG. 5A, an optical stack, such as optical stack 400 of FIG. 4, overlying an image pixel, such as pixel 22 of FIG. 2, may exhibit different transmission profiles at different exposure times. For example, curve 502 may correspond to the transmission through the optical stack when pixel 22 is new (e.g., at exposure time 0), curve 504 may correspond to the transmission through the optical stack after 5 hours of exposure, for 50 hours of exposure, for less than 500 hours of exposure, or for more than 100 hours of exposure, and curve 506 may correspond to the transmission through the optical stack after 1000 hours of exposure, as examples.

Similarly, FIG. 5B illustrates different transmission profiles at different operating times for an optical stack having different characteristics than the optical stack in FIG. 5A. Curves 508, 510, and 512 may correspond to transmission profiles after the same amount of exposure time as the curves 502, 504, and 506, respectively. However, the optical stacks associated with curves 510 and 512 may have much lower transmission than the optical stacks associated with curves 504 and 506. For example, the optical stacks associated with curves 510 and 512 may have 10% lower transmission, 20% lower transmission, or any other relative transmission level in comparison to the optical stacks associated with curves 504 and 506.

The reduction in transmission illustrated by curves 504, 506, 510, and 512 may be caused by weathering of optical stacks overlying the image pixels within the image pixel array. For example, if the image pixel array is exposed to sunlight for extended periods of time, solar energy may damage some of the layers within the optical stacks that overlap the image pixels, thereby reducing the amount of light that reaches any given image pixel. The difference in transmission between the curves in FIG. 5A and the curves in FIG. 5B may be due to the use of different materials in the respective optical stacks.

In one embodiment, the optical stack corresponding to FIG. 5A may be provided without an antireflection coating, while FIG. 5B may be provided with an antireflection coating, such as antireflection coating 410 of FIG. 4. Although antireflection coating 410 may improve the transmission of ambient light to an underlying image sensor pixel and enhance the sensitivity of the pixel, antireflection coatings may deteriorate due to weathering, thereby reducing the overall transmission through the optical stack throughout the life of the image sensor. In other words, image sensor pixels that do not have an overlying antireflection coating layer may be less prone to weathering deterioration than image sensors that do have an overlying antireflection coating.

In another embodiment, the optical stack corresponding to FIG. 5A may be provided with color filter resist, such as color filter resist 404, formed from a first pigment, while the optical stack corresponding to FIG. 5B may be provided with color filter formed from a second pigment that is different from the first pigment. In general, pigments may be degraded by exposure to sunlight and solar energy. This degradation of pigments is illustrated in Equation 1, $$P \xrightarrow{hv} P \cdot \cdot \cdot P \qquad (1)$$

where P is a pigment particle, P• is a pigment particle radical, and hv is energy from light. Therefore, when a pigment in a color filter resist is exposed to sunlight, the pigment may degrade into pigment radicals, which may bleach portions of the color filter resist and/or cause general discoloration of the pigment.

Different types of pigments may degrade at different rates or to different degrees. For example, pigments may be formed from one or more metallic or organic chromophores, each of which may have a different response to sunlight exposure. However, this is merely illustrative. In general, pigments may contain any desired materials to impart any desired color, and these materials may have different responses to solar energy.

In the example of FIGS. 5A and 5B, the first pigment used in the color filter resist associated with FIG. 5A may be formed from components that are more resistant to weathering and/or solar degradation than the second pigment used in the color filter resist associated with FIG. 5B.

Figure 6:
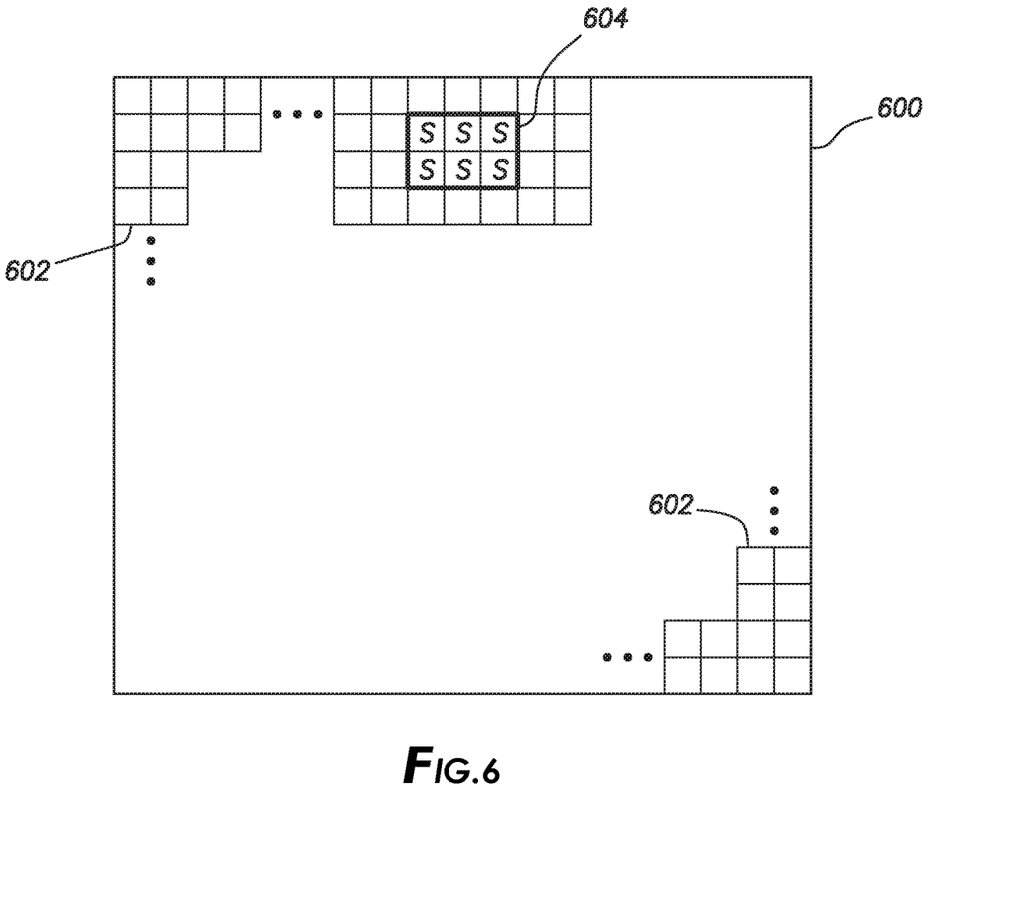
FIG. 6 is a diagram of a color filter array having main pixels and reference pixels in accordance with an embodiment.

Using pixels with different degrees of resistance to weathering and/or solar degradation may allow for the detection of weathering across an image pixel array. As shown in FIG. 6, for example, image pixel array 600 includes main pixels 602 and reference pixels 604 (each reference pixel is designated "S"). Reference pixels 604 may have overlying layers (e.g., optical stacks) that are more resistant to weathering and solar degradation than main pixels 602. For example, optical stacks overlapping main pixels 602 may have an antireflection coating, while optical stacks overlapping reference pixels 604 may be formed without an antireflection coating. As a result, reference pixels may be more resistant to degradation due to solar energy than main pixels 602. However, because having an antireflection coating increases transmission to underlying image pixels, it may be desirable to provide most pixels within pixel array 600 with an antireflection coating. Alternatively or additionally, reference pixels 604 may be provided with a color filter resist formed from a pigment or a set of pigments that is more resistant to solar degradation than a pigment or a set of pigments associated with main pixels 602. However, these are merely illustrative. In general, reference pixels 604 and/or the corresponding overlying layers may be modified in any desired manner that increases resistance to solar degradation and/or weathering as compared to main pixels 602.

Reference pixels 604 (e.g., pixels without an antireflection coating or pixels corresponding with a pigment having increased resistance to solar degradation) may be interspersed throughout array 600. Single reference pixels, groups of two or more reference pixels, groups of four or more reference pixels, groups of fewer than 10 reference pixels, or groups of more than 8 reference pixels may be provided in at least one location within array 600. These single reference pixels or groups of reference pixels may be located at regular intervals within array 600 or may be provided at irregular intervals within array 600. For example, a group of reference pixels may be provided in four corner portions and a central portion of array 600, groups of reference pixels may be located at intervals across the array of pixels, a single reference pixel may be provided for every 100 main pixels, or reference pixels may be interspersed between main pixels throughout the array. However, these are merely illustrative. In general, any number of reference pixels 604 may be provided at any desired location(s) within array 600.

The presence of both main pixels 602 and reference pixels 604 may allow for a comparison of an output of main pixels 602 with an output of reference pixels 604 (e.g., a comparison between image signals generated by main pixels 602 and image signals generated by reference pixels 604). For example, if main pixels 602 exhibit lower transmission profiles than reference pixels 604 (which are less prone to weathering than main pixels 602), then at least some pixels within array 600 may be degraded due to weathering. In this way, processing circuitry may determine whether or not weathering has impacted the performance of image pixel array 600 and indicate whether or not remedial action is needed. For example, if a difference between transmissions corresponding to main pixels 602 and reference pixels 604 is above a threshold, a warning may be issued to a user of the imaging system. This difference threshold may be a difference of more than 10% between the main pixels and the reference pixels, more than 20% between the main pixels and the reference pixels, less than 30% between the main pixels and the reference pixels, or more than 25% between the main pixels and the reference pixels. However, these ranges are merely illustrative. In general, any desired difference threshold may be used.

Figure 7:
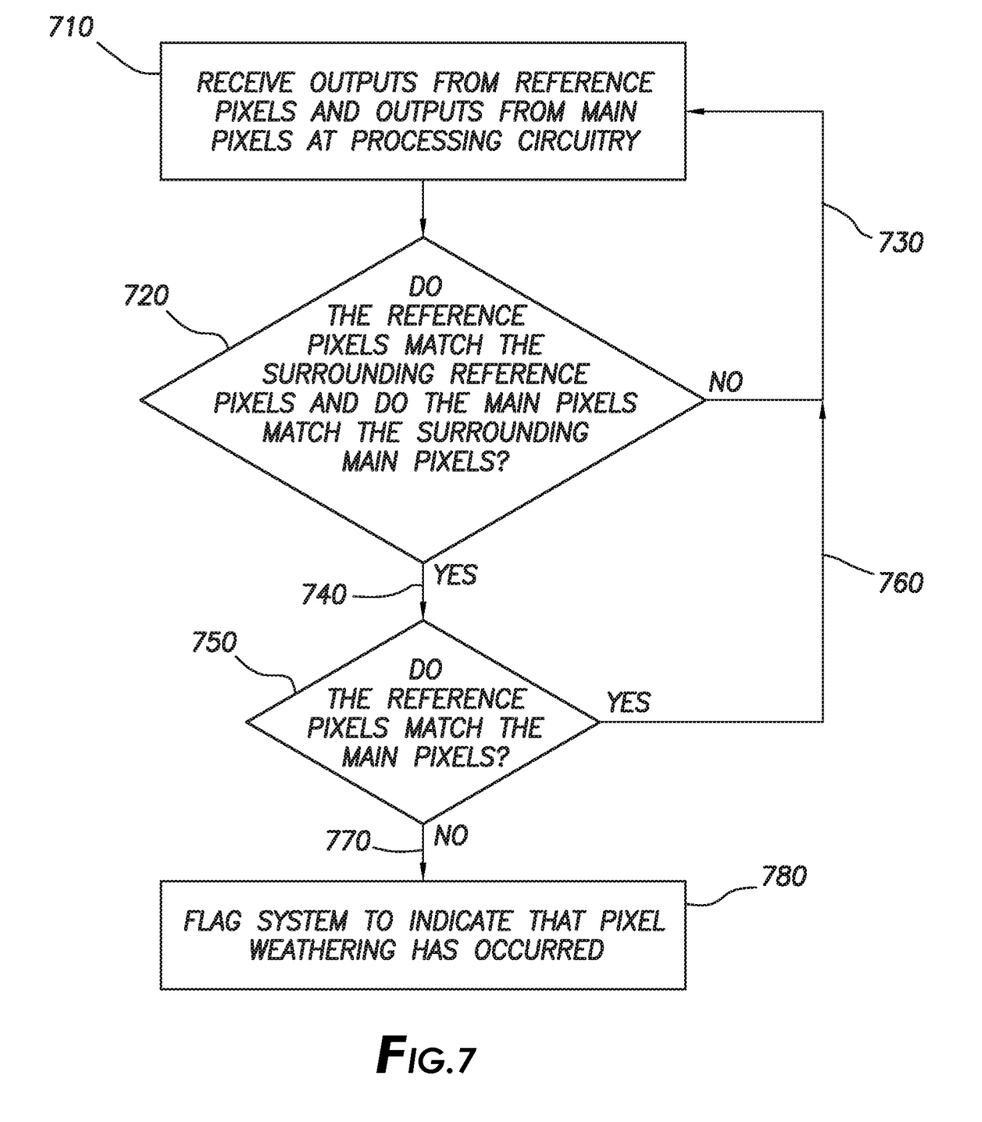
FIG. 7 is a diagram illustrating a method of comparing main pixels and reference pixels to determine whether weathering has deteriorated portions of a pixel array in accordance with an embodiment.

FIG. 7 shows an illustrative method of comparing the reference pixels to the main pixels to determine whether weathering and/or solar degradation has occurred. At step 710, processing circuitry (e.g., either processing circuitry associated with the imaging sensor, such as processing circuitry 24 of FIG. 2, or processing circuitry in another component), may receive outputs of reference pixels, such as reference pixels 604 of FIG. 6, and outputs of main pixels, such as main pixels 602 of FIG. 6. The outputs of these pixels may be charge generated by the pixels, image signals generated by the pixels, image data that is based on image signals generated by the pixels, or any other desired output that has been directly or indirectly generated by the image pixels.

At step 720, the processing circuitry may compare the outputs of main pixels to the outputs of surrounding main pixels and compare the outputs of reference pixels to the outputs of surrounding reference pixels. These comparisons may be performed within a desired tolerance (sometimes referred to herein as a difference threshold). For example, there may be a tolerance of 5%, 10%, or any other desired tolerance. The processing circuitry performs this comparison to ensure that the outputs being analyzed are a flat field, meaning that there are not portions of the output that could interfere with later comparisons made by the processing circuitry. If the outputs of the main pixels do not match the outputs of surrounding main pixels within the selected tolerance and/or the outputs of the reference pixels do not match the outputs of surrounding reference pixels within the selected tolerance, the processing circuitry may determine that the output is not a flat field, and the method may proceed along path 730. The processing circuitry may then receive new outputs from the main pixels and reference pixels. Alternatively, if the outputs of the main pixels do match the outputs of the surrounding main pixels within the selected tolerance and/or the outputs of the reference pixels do match the outputs of the surrounding main pixels within the selected tolerance, the processing circuitry may determine that the output is a flat field, and the method may proceed along path 740 to step 750.

At step 750, the processing circuitry may compare the outputs of the main pixels to the outputs of the reference pixels. This comparison may be performed within a desired tolerance (sometimes referred to herein as a difference threshold). For example, there may be a tolerance of 5%, 10%, or any other desired tolerance. The reference pixels may be formed from different layers and/or materials than the main pixels, and may therefore be less prone to weathering and/or solar degradation. If the outputs of the reference pixels match the main pixels, indicating that the main pixels have not been degraded past an allowable tolerance, the method may proceed along path 760. The processing circuitry may then receive new outputs from the main pixels and the reference pixels (e.g., to perform another comparison between the main pixels and the reference pixels). Alternatively, if the outputs of the reference pixels do not match the main pixels, indicating that the main pixels have degraded past an allowable tolerance, the method may proceed along path 770 to step 780.

At step 780, the processing circuitry may flag and/or alert the system (e.g., the imaging system, the electronic device, etc.) to indicate that pixel weathering has occurred. The method illustrated in FIG. 7 may occur continuously, may be triggered by the processing circuitry at regular intervals, may be triggered by the processing circuitry at irregular intervals, may be triggered by the processing circuitry whenever an imaging device is powered on, may be triggered by a user of a device containing the imaging circuitry, or may be triggered by any other desired means.

The image sensor having both main pixels and reference pixels and the corresponding comparison circuitry may be used in a security camera, an imaging device in a vehicle, or in any other desired device. For example, the method shown in FIG. 7 may be implemented as part of Automotive Safety Integrity Level (ASIL) testing for an imaging device in an automobile. Automotive vehicles may have image sensors for a variety of functions. These may be implemented in backup cameras, side mirror cameras, autonomous handling and/or driving cameras, or may be implemented for any other purpose. In some cases, vehicles may include onboard processors that use outputs from these image sensors in various algorithms to provide feedback to a driver, to control an automotive vehicle, or to perform other desired functions. In some cases, weathering of pixels within these sensors may negatively impact results of the various algorithms, potentially creating unsafe situations for drivers and passengers of the vehicles. Comparing output data of reference pixels that are resistant to weathering and main pixels may allow automotive vehicles to display a warning so that drivers and/or mechanics may be aware of the problem and take remedial action, such as repairing or replacing the image sensor or imaging system.

Various embodiments have been described illustrating image sensors having main pixels and reference pixels that are more resistant to weathering than the main pixels, as well as methods of comparing the outputs of the main pixels and the reference pixels to determine whether deterioration due to weathering has occurred.

In various embodiments of the present invention, an image sensor may have an array or pixels that generate image signals. The array of pixels may include a first set of pixels and a second set of pixels. The second set of pixels may be reference pixels, and may be more resistant to solar degradation than the first set of pixels, which may be main pixels. The image sensor may include processing circuitry that receives the generated image signals and may compare the image signals generated by the first set of pixels and the second set of pixels.

In accordance with an embodiment, each of the pixels in the array of image pixels may be overlapped by an optical stack, and the optical stack may include a color filter resist. Each pixels of the first set of pixels may be overlapped by a first optical stack having a first color filter resist formed from a first pigment and each pixel of the second set of pixels may be overlapped by a second optical stack having a second color filter resist formed from a second pigment that is different from the first pigment. In some embodiments, the second pigment may be more resistant to solar degradation than the first pigment.

In some embodiments, each pixel of the first set of pixels may be overlapped by a first optical stack having an anti-reflection coating, and each pixel of the second set of pixels may be overlapped by a second optical stack that does not have an antireflection coating. The color filter resist of each first optical stack may be interposed between the antireflection coating and the respective pixels of the first set of pixels. The antireflection coating on each of the first optical stacks may be formed from silicon dioxide.

In accordance with an embodiment, the processing circuitry may be configured to output an alert signal (e.g., a flag) in response to determining that the image signals generated by the first set of pixels do not match the image signals generated by the second set of pixels. The second set of pixels may be interspersed between the pixels of the first set of pixels throughout the array of pixels. Additionally or alternatively, the second set of pixels may include groups of at least two pixels, and the groups of the at least two pixels may be located at intervals across the array of pixels.

In various embodiments of the present invention, an imaging system may include an image sensor having an array of pixels that generate charge in response to incident light. The array of pixels may include first pixels that are overlapped by first optical stacks and second pixels that are overlapped by second optical stacks that are different from the first optical stacks. The imaging system may further include processing circuitry that may receive outputs from the first pixels and the second pixels and compare the outputs of the first pixels to the outputs of the second pixels.

In accordance with an embodiment, the first optical stacks may include antireflection coatings and the second optical stacks may not include antireflection coatings. Alternatively or additionally, the first optical stacks may include a first set of pigments and the second optical stack may include a second set of pigments that is different from the first set of pigments. In some cases, the first pixels may be main pixels, the second pixels may be reference pixels, and the second set of pigments may be more resistant to weathering than the first set of pigments. The processing circuitry may output an alert in response to determining that the outputs of the first and second pixels do not match within a difference threshold.

In accordance with various embodiments a method of operating an imaging system to determine whether pixels in an array of image pixels have been deteriorated may include using first and second set of image pixels in the array of image pixels to generate charge in response to incident light and to output the generated charge to processing circuitry. The processing circuitry may receive the output from the first and second sets of image pixels and may determine whether the output from the first set of image pixels matches the output from the second set of image pixels.

In some embodiments, the imaging system may be flagged and/or alerted to indicate that at least some of the image pixels have been deteriorated in response to determining that the output from the first set of image pixels does not match the output from the second set of image pixels. Determining whether the output from the first set of image pixels matches the output from the second set of image pixels may include determining whether the outputs from the first and second sets of image pixels match within a difference threshold.

In some embodiments, the processing circuitry may determine whether the output from a first group of image pixels of the first set of image pixels matches the output from a second group of image pixels of the first set of image pixels and may determine whether the output from a first group of image pixels of the second set of image pixels matches the output from a second group of image pixels of the second set of image pixels. Determining whether the output from the first set of image pixels matches the output from the second set of image pixels may be performed in response to determining that the output from the first and second groups of image pixels of the first set of image pixels match and that the output from the first and second groups of image pixels of the second set of image pixels match.

The foregoing is merely illustrative and various modifications can be made to the described embodiments. The foregoing embodiments may be implemented individually or in any combination.

What is claimed is:

1. An image sensor comprising:
    an array of pixels configured to generate image signals, wherein the array of pixels includes a first set of pixels and a second set of pixels and wherein the second set of pixels are configured to be more resistant to solar degradation than the first set of pixels; and
    processing circuitry that is configured to receive the generated image signals, to compare the image signals generated by the first set of pixels and the image signals generated by the second set of pixels, and to output an alert signal in response to determining that the image signals generated by the first set of pixels do not match the image signals generated by the second set of pixels.

2. The image sensor defined in claim 1 wherein each of the pixels of the first and second sets of pixels is overlapped by an optical stack and wherein each optical stack comprises a color filter resist.

3. The image sensor defined in claim 2 wherein each pixel of the first set of pixels is overlapped by a first optical stack having a first color filter resist formed from a first pigment and each pixel of the second set of pixels is overlapped by a second optical stack having a second color filter resist formed from a second pigment that is different from the first pigment.

4. The image sensor defined in claim 3 wherein the second pigment is more resistant to solar degradation than the first pigment.

5. The image sensor defined in claim 2 wherein each pixel of the first set of pixels is overlapped by a first optical stack having an antireflection coating and wherein each pixel of the second set of pixels is overlapped by a second optical stack that does not have an antireflection coating.

6. The image sensor defined in claim 5 wherein the color filter resist of each first optical stack is interposed between the antireflection coating and the respective pixel of the first set of pixels.

7. The image sensor defined in claim 6 wherein the antireflection coating is formed from silicon dioxide.

8. The image sensor defined in claim 1 wherein the pixels of the second set of pixels are interspersed between the pixels of the first set of pixels throughout the array of pixels.

9. The image sensor defined in claim 1 wherein the second set of pixels comprises groups of at least two pixels and wherein the groups of the at least two pixels are located at intervals across the array of pixels.

10. An imaging system comprising:
    an image sensor that includes an array of pixels configured to generate charge in response to incident light, wherein the array of pixels includes first pixels that are overlapped by first optical stacks and second pixels that are overlapped by second optical stacks that are different from the first optical stacks, wherein the first optical stacks include antireflection coatings, and wherein the second optical stacks do not include antireflection coatings; and
    processing circuitry that is configured to receive outputs from the first pixels and the second pixels and to compare the outputs of the first pixels to the outputs of the second pixels.

11. The imaging system defined in claim 10 wherein the first optical stacks include a first set of pigments and wherein the second optical stacks include a second set of pigments that is different from the first set of pigments.

12. The imaging system defined in claim 11 wherein the first pixels are main pixels, wherein the second pixels are reference pixels, and wherein the second set of pigments is more resistant to weathering than the first set of pigments.

13. The imaging system defined in claim 10 wherein the processing circuitry is configured to output an alert in response to determining that the outputs of the first and second pixels do not match within a threshold difference.

14. A method of operating an imaging system to determine whether image pixels in an array of image pixels have been deteriorated, the method comprising:
    with first and second sets of image pixels in the array of image pixels, generating charge in response to incident light and outputting the generated charge to processing circuitry;
    with the processing circuitry, receiving the output from the first and second sets of image pixels;
    with the processing circuitry, determining whether the output from a first group of image pixels of the first set of image pixels matches the output from a second group of image pixels of the first set of image pixels, and determining whether the output from a first group of image pixels of the second set of image pixels matches the output from a second group of image pixels of the second set of image pixels; and
    with the processing circuitry, after determining whether the outputs from the first group and second group of image pixels of the first set of image pixels match and whether the outputs from the first group and second group of image pixels of the second set of image pixels match, determining whether the output from the first set of image pixels matches the output from the second set of image pixels.

15. The method defined in claim 14 further comprising:
    in response to determining that the output from the first set of image pixels does not match the output from the second set of image pixels, flagging the imaging system to indicate that at least some of the image pixels have been deteriorated.

16. The method defined in claim 15 wherein determining whether the output from the first set of image pixels matches the output from the second set of image pixels comprises determining whether the outputs from the first and second sets of image pixels match within a difference threshold.

17. The method defined in claim 14 wherein determining whether the output from the first set of image pixels matches the output from the second set of image pixels comprises determining whether the output from the first set of image pixels matches the output from the second set of image pixels in response to determining that the output from the first and second groups of image pixels of the first set of image pixels match and that the output from the first and second groups of image pixels of the second set of image pixels match.

* * * * *